April 21, 1959 R. C. QUACKENBUSH 2,882,704
CLUTCH WITH OVERLOAD RELEASE
Filed June 18, 1957
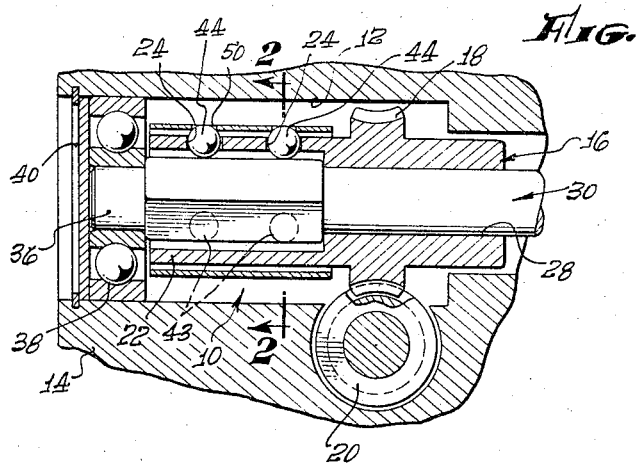
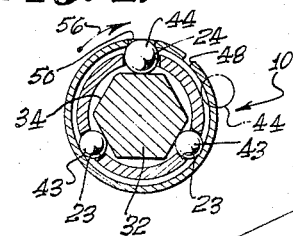
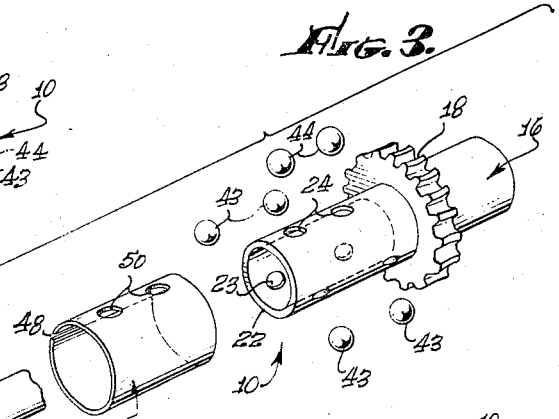
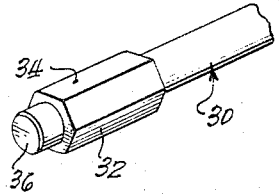
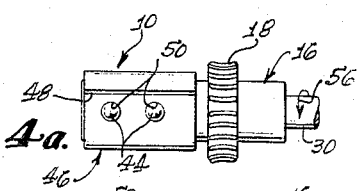
Robert C. Quackenbush,
INVENTOR.
By Thomas C. Maloney
ATTORNEY.

United States Patent Office 2,882,704
Patented Apr. 21, 1959

2,882,704

CLUTCH WITH OVERLOAD RELEASE

Robert C. Quackenbush, San Fernando, Calif.

Application June 18, 1957, Serial No. 666,439

12 Claims. (Cl. 64—29)

This invention relates to a torque responsive clutch which is adapted to be interposed between driving and driven members and to automatically sever the operative relationship of said driving and driven members when the driven member is subjected to loads in excess of the designed loads of the mechanism in which the clutch of the invention is incorporated.

It is, therefore, an object of my invention to provide a clutch which includes a driven member disposed in spaced relationship with a drive member and having connecting means mounted in said drive member engageable with an adjacent surface of the driven member whereby the movement of the driven member may be caused by corresponding movement of the drive member transmitted through the connecting means. Furthermore, the connecting means are urged into engagement with the adjacent surface of the driven member by resilient means disposed in overlying relationship with the drive member.

Another object of my invention is the provision, in a clutch of the aforementioned character, of a drive member constituted by an elongated, tubular extension on one extremity of a drive shaft, said tubular extension overlying an adjacent portion of a driven shaft and mounting connecting means constituted by a plurality of clutch balls which are urged into engagement with the periphery of the driven shaft by means of a split spring sleeve disposed in overlying relationship with the drive shaft. During normal operation of the drive and driven shafts, the clutch balls transmit torque from the drive to the driven shaft. However, when the driven shaft is subjected to loads in excess of the design loads of the mechanism in which it is installed, the clutch balls are driven radially outward against the bias of the split spring sleeve and thus the drive shaft can continue to rotate with respect to the driven shaft and destruction of the driven shaft and the parts of the mechanism energized thereby is obviated.

A further object of my invention is the provision of a clutch of the aforementioned character wherein the split spring sleeve is positively connected to the drive shaft with which it is associated through the medium of at least one of the balls constituting the connecting means between the driving and driven shafts in order that the split spring sleeve may be rotated by and concomitantly with said drive shaft.

It is common knowledge that simple torque responsive clutches are not usually adjustable to accommodate different torque limits in the devices in which they are installed and this lack of adjustability frequently prevents proper operation of devices in which such conventional torque responsive clutches are embodied.

Another object of my invention is the provision, in a clutch of the aforementioned character, of a split spring sleeve which is positively connected to the drive shaft with which it is associated in the above described manner and which is reversible in order that the point of positive connection of the sleeve with respect to the drive shaft may be disposed on the opposite side of the split therein, either toward or away from the direction of rotation of the drive shaft, so that a correspondingly greater or lesser torque may be transmitted through the clutch incorporating said split spring sleeve.

The action of the split spring sleeve in the above described manner to achieve the difference in the torque transmittable through the clutch of my invention is attributable to the fact that, when the point of positive connection of the sleeve is disposed on the side of the split therein closer to the direction of rotation of the drive shaft, there is a tendency for the sleeve to wrap more tightly around the periphery of the drive shaft because the sleeve is literally being pulled into closer relationship with the periphery of the drive shaft.

Conversely, when the point of positive connection of the split spring sleeve to the drive shaft is disposed on the side of the split in the sleeve away from the direction of rotation of the drive shaft, there is a tendency to unwrap the sleeve from the drive shaft since the sleeve is being pushed away from the drive shaft periphery rather than being pulled thereabout.

Other objects and advantages of my invention will be apparent from the following specification and the accompanying drawing which is for the purpose of illustration only and in which:

Fig. 1 is a vertical, sectional view of a clutch constructed in accordance with the teachings of my invention;

Fig. 2 is a transverse, sectional view taken on the broken line 2—2 of Fig. 1;

Fig. 3 is an exploded view showing the various components of the clutch of my invention;

Fig. 4a is a diagrammatic view illustrating the operation of the clutch by varying the point of positive connection of the split spring sleeve to the drive shaft; and Fig. 4b is a view similar to Fig. 4a but showing the point of positive connection of the split spring sleeve to the drive shaft disposed opposite to the manner in which it is disposed in Fig. 4a.

Referring to the drawing, and particularly to Figs. 1–3 thereof, I show a torque responsive clutch, generally indicated at 10, said torque responsive clutch being illustrated as embodied within a bore 12 in a portion of a housing 14. Located within the bore 12 is a drive shaft 16, said drive shaft having a worm gear 18 formed thereupon and engageable with a worm 20 connected through a source of power, such as an electric motor or the like, not shown.

The left-hand end of drive shaft 16 is provided wtih a tubular extension 22, said tubular extension being of circular cross section and having a plurality of circumferentially spaced pairs of openings 23 formed in the wall thereof. Interposed between the spaced pairs of openings 23 is a larger pair of openings 24, for a purpose which will be described in greater detail below.

The drive shaft 16 incorporates an axial bore 28 in which is located a coaxial driven shaft 30 which is provided with a lateral extension 32 located within the interior of the tubular extension 22 on the drive shaft 16. The extension 32 is provided with a plurality of clutch surfaces or faces 34, which, as best illustrated in Fig. 2 of the drawing, are disposed tangentially with respect to the inner surface of the wall of the tubular extension 22.

The left-hand extremity of the extension 32 of the driven shaft 30 has a journal 36 formed integrally therewith, said journal being supported in a ball bearing 38 mounted within the left-hand extremity of the bore 12 which is closed by a circular cover 40. Clutch balls 43 are mounted in the radial openings 23 in the wall of the tubular extension 22 of the drive shaft 16, the diameter of said clutch balls being slightly smaller than the diameter of the openings to permit radial movement of the clutch balls with reference to the adjacent clutch faces 34 on the driven shaft extension 32.

Also provided is a plurality of somewhat larger clutch balls 44 which are located in the openings 24 and which are also of somewhat smaller diameter than the diameter of the openings with which they are associated in order to permit corresponding radial movement of said balls 44 when radial movement of the balls 43 takes place.

The clutch balls 43 and 44 are adapted to engage the clutch surfaces or faces 34 on the extension 32 of the driven shaft 30 and to constitute, in a manner to be described in greater detail below, the operative connection between the drive shaft 16 and the driven shaft 30.

Disposed in encompassing relationship with the tubular extension 22 of the drive shaft 16 is a resilient member constituted by a split spring sleeve 46 whose opposite extremities are separated by an axial split 48. A pair of openings 50 is formed in the spring sleeve 46 in an extremity adjacent the axial split 48. The openings 50 are adapted to engage upon the projecting peripheries of the clutch balls 44 and serve as a positive connection in conjunction with said clutch balls whereby the split spring sleeve 46 is rotated by the drive shaft 16. It will be noted that the compression of the spring sleeve 46 drives the clutch balls 43 and 44 into operative engagement with adjacent clutch surfaces 34 on the extension 32 of the driven shaft 30.

Therefore, when the drive shaft 16 is energized, the clutch balls 43 and 44 serve as connecting means whereby torque is transmitted from the drive shaft 16 to the clutch faces 34 on the extension 32 of the driven shaft 30. However, should the driven shaft 30 be subjected to loads in excess of those for which the clutch 10 is designed, the counter-torque to which the driven shaft 30 is subjected will cause a reaction against the clutch balls 43 and 44 driving said balls radially outward in their associated openings against the compressive effect of the split sleeve 46 and permitting the drive shaft 16 to rotate relative to the driven shaft 30. In this way, breakage of the driven shaft 30 or other component parts of the mechanism in which the clutch 10 is incorporated is obviated.

As soon as the excessive load on the drive shaft 30 is eliminated, the balls 43 and 44 once again serve as effective connecting means between the drive and driven shafts 16 and 30, respectively, and rotation of the driven shaft 30 by the drive shaft 16 is automatically initiated.

The clutch 10 can be utilized to transmit torque at two different levels because of the reversibility of the split spring sleeve 46 and the operative connection constituted by the clutch balls 44 and the openings 50 in the split spring sleeve 46, in a manner to be described in greater detail below. In order to facilitate the description of the reversal of the position of the operative connection of the split spring sleeve 46 with respect to the drive shaft 16, the operative connection constituted by the clutch balls 44 and the openings 50 in said sleeve will be designated as being on one side or the other of the split 48 in said sleeve, either closer toward or away from the direction of rotation of the drive shaft 16 with which the sleeve 46 is associated.

To illustrate this mode of operation, reference is made to Fig. 2 of the drawing wherein the arrow 56 designates the rotation of the entire clutch assembly and the drive shaft 16 in a clockwise direction. The operative connection constituted by the clutch balls 44 and the openings 50 in the sleeve 46 engageable thereby is disposed to the left-hand side of the split 48 and is referred to as being closer to the direction of rotation of the clutch 10. This position of the operative connection of the sleeve 46 is illustrated in side elevation in Fig. 4b of the drawing. When the sleeve is so located with respect to the drive shaft 16, the clockwise rotation of the shaft 16 tends to wrap the split spring sleeve 46 more tightly around the balls 43 and 44 and thus to resist release of the clutch faces 34 from the balls 43 and 44.

Actual tests on a particular clutch model have indicated that the torque transmitted through the clutch 10 is much greater than when the operative connection of the sleeve 46 to the drive shaft 16 is reversed into the position shown in Fig. 4a of the drawing.

In Fig. 4a of the drawing, the operative connection constituted by the balls 44 and the openings 50 is disposed on the side of the split 48 away from the direction of rotation, as indicated by the arrow 56 and as also indicated by the dotted lines in Fig. 2 of the drawing. When the operative connection is disposed in the position shown in Figs. 2 and 4a of the drawing, there is a tendency for rotation of the drive shaft to slightly unwrap the split spring sleeve 46 with reference to the clutch balls 43 and 44. Therefore, when the clutch balls 43 and 44 are subjected to countertorque due to excessive load being placed upon the driven shaft 30, the lighter compressive force of the split sleeve 46 on said balls permits them to be moved radially outward by the countertorque more easily than when the positive connection between the sleeve 46 and the drive 16 is disposed in the position shown in Figs. 2 and 4b of the drawing.

I thus provide by my invention a torque responsive clutch which is characterized by its simplicity of construction and efficiency of operation and which is particularly notable for the fact that it can be utilized to drive mechanisms designed to be subjected to different loads because it can be adjusted to transmit different torque levels.

I claim as my invention:

1. In a torque responsive clutch, the combination of: a driven member; a driving member disposed in spaced relationship with said driven member; connecting means mounted in said driving member for transmitting movement of said driving to said driven member, said connecting means being constituted by balls engageable with said driven member; and reversible resilient means urging said connecting means into operative engagement with said driven member, said resilient means being positively connected by a ball to said driving member to impose a wrapping force on said resilient means determinative of the torque at which said clutch will release.

2. In a clutch, the combination of: a driven shaft; a drive shaft having a portion disposed in spaced relationship with said drive shaft; clutch balls mounted in said drive shaft; and reversible resilient means encompassing said drive shaft and urging said balls against said driven shaft, said resilient means having opposed free ends, one of which is fixedly secured to said drive shaft by a ball to prevent relative rotation between said one free end and said drive shaft.

3. In a clutch, the combination of: a driven shaft; a drive shaft having a portion disposed in spaced relationship with said drive shaft; clutch balls mounted in said drive shaft; and reversible resilient means encompassing said drive shaft and urging said balls against said driven shaft, said resilient means being constituted by a split ring disposed in overlying relationship with said balls to urge them against said driven shaft, said split ring having one end fixedly secured to said drive shaft by a ball to prevent relative rotation between said one end and said drive shaft.

4. In a clutch, the combination of: a driven shaft having clutch surfaces provided thereupon; a drive shaft having a portion disposed in spaced relationship with said drive shaft; clutch balls mounted in said drive shaft; resilient means encompassing said drive shaft and urging said balls against said clutch surfaces of said driven shaft, said clutch surfaces being constituted by flats tangential to the adjacent portion of said drive shaft; and a ball connecting member interposed between said drive shaft and said resilient member to positively connect said resilient member to said drive shaft.

5. In a clutch, the combination of: a drive shaft having a tubular extension upon an end thereof, the wall of said tubular extension incorporating a plurality of radial openings; a driven shaft disposed within said extension and having clutch surfaces formed thereupon; clutch balls mounted in said openings and engageable with said clutch surfaces; a resilient member encompassing said extension and urging said balls into engagement with said clutch surfaces; and a ball connecting member interposed between said drive shaft and said resilient member to positively connect said resilient member to said drive shaft.

6. In a clutch, the combination of: a drive shaft having a tubular extension upon an end thereof, the wall of said tubular extension incorporating a plurality of radial openings; a driven shaft disposed within said extension and having clutch surfaces formed thereupon; clutch balls mounted in said openings and engageable with said clutch surfaces; a resilient member encompassing said extension and urging said balls into engagement with said clutch surfaces, said resilient member being constituted by a split spring sleeve engageable with said balls; and a ball connecting member positively connecting one end of said sleeve to said drive shaft.

7. In a clutch, the combination of: a drive shaft having a tubular extension upon an end thereof, the wall of said tubular extension incorporating a plurality of radial openings; a driven shaft disposed within said extension and having clutch surfaces formed thereupon; clutch balls mounted in said openings and engageable with said clutch surfaces; and a resilient member encompassing said extension and urging said balls into engagement with said clutch surfaces, said resilient member being constituted by a split spring sleeve engageable with said balls, said sleeve being positively connected to and rotatable with said drive shaft.

8. In a clutch, the combination of: a drive shaft having a tubular extension upon an end thereof, the wall of said tubular extension incorporating a plurality of radial openings; a driven shaft disposed within said extension and having clutch surfaces formed thereupon; clutch balls mounted in said openings and engageable with said clutch surfaces; and a resilient member encompassing said extension and urging said balls into engagement with said clutch surfaces, said resilient member being constituted by a split spring sleeve engageable with said balls, said sleeve having a ball engaging opening therein for receiving one of said balls to create a positive connection between said extension and said sleeve and to rotate said sleeve with said drive shaft.

9. In a clutch, the combination of: a drive shaft having a tubular extension upon an end thereof, the wall of said tubular extension incorporating a plurality of radial openings; a driven shaft disposed within said extension and having clutch surfaces formed thereupon; clutch balls mounted in said openings and engageable with said clutch surfaces; and a resilient member encompassing said extension and urging said balls into engagement with said clutch surfaces, said resilient member being constituted by a split spring sleeve engageable with said balls, said sleeve being positively connected to and rotatable with said drive shaft and being reversible to dispose said positive connection on one side or the other of said split to determine the maximum torque transmitted to said driven shaft by said drive shaft.

10. In a clutch, the combination of: a drive shaft having a tubular extension upon an end thereof, the wall of said tubular extension incorporating a plurality of radial openings; a driven shaft disposed within said extension and having clutch surfaces formed thereupon; clutch balls mounted in said openings and engageable with said clutch surfaces; and a resilient member encompassing said extension and urging said balls into engagement with said clutch surfaces, said resilient member being constituted by a split spring sleeve engageable with said balls, said sleeve having a ball engaging opening therein for receiving one of said balls to create a positive connection between said extension and said sleeve and to rotate said sleeve with said drive shaft, said sleeve being positively connected to and rotatable with said drive shaft.

11. In a clutch, the combination of: a drive shaft having a tubular extension upon an end thereof, the wall of said tubular extension incorporating a plurality of radial openings; a driven shaft disposed within said extension and having clutch surfaces formed thereupon; clutch balls mounted in said openings and engageable with said clutch surfaces; and a resilient member encompassing said extension and urging said balls into engagement with said clutch surfaces, said resilient member being constituted by a sleeve having an axial split therein and an opening engaging one of said balls to provide a positive connection between said drive shaft and said driven shaft, and said sleeve being reversible so that the positive connection of said sleeve with said drive shaft can be disposed on the side of said split toward the direction of rotation or away from the direct of rotation to correspondingly increase or decrease the maximum torque transmitted through said clutch.

12. In a torque responsive clutch, the combination of: a drive shaft; a driven shaft disposed in spaced relation with said drive shaft; displaceable connecting means between said drive and driven shafts; a wrap-around clutch spring engageable with said connecting means and positively connected to said drive shaft by one of said connecting means; and a positive, reversible connection between said spring and said drive shaft constituted by a ball connecting said spring and said drive shaft.

References Cited in the file of this patent

UNITED STATES PATENTS

| | | |
|---|---|---|
| 1,325,464 | Decker | Dec. 16, 1919 |
| 1,805,692 | Ferenci | May 19, 1931 |
| 2,501,648 | Ogden | Mar. 21, 1950 |
| 2,631,696 | Yarber | Mar. 17, 1953 |
| 2,668,426 | Hoover | Feb. 9, 1954 |
| 2,692,486 | Anderson | Oct. 26, 1954 |
| 2,773,370 | Intraub et al. | Dec. 11, 1956 |